United States Patent [19]

Dorey

[11] 4,151,529

[45] Apr. 24, 1979

[54] RADIO BEACON FOR AERIAL NAVIGATION SYSTEM

[75] Inventor: Jacques A. Dorey, Combs-la-Ville, France

[73] Assignee: Office National d'Etudes et de Recherches Aerospatiales (O.N.E.R.A.), Chatillon, France

[21] Appl. No.: 812,733

[22] Filed: Jul. 5, 1977

[30] Foreign Application Priority Data

Jul. 9, 1976 [FR] France .............................. 76 21155

[51] Int. Cl.$^2$ ............................................. G01S 1/44
[52] U.S. Cl. ......................... 343/106 D; 343/113 DE
[58] Field of Search ..................... 343/106 D, 113 DE

[56] References Cited

U.S. PATENT DOCUMENTS

3,173,093  3/1965  Most et al. .................... 343/113 DE
3,503,071  3/1970  Earp .............................. 343/113 DE

FOREIGN PATENT DOCUMENTS

1088384  10/1967  United Kingdom ............... 343/106 D

*Primary Examiner*—Theodore M. Blum
*Attorney, Agent, or Firm*—Karl F. Ross

[57] ABSTRACT

An air-navigational beacon, designed to simulate an imaginary circular beacon with a multiplicity of pairs of diametrically opposite dipoles excited in cyclic succession, comprises an array of stationary dipole pairs disposed along lines parallel to a given direction. The spacing of the dipoles of each pair varies from one pair to another according to a sinusoidal law in their order of energization. The two dipoles of a pair are energized in relative quadrature and with a signal amplitude proportional to their spacing.

7 Claims, 9 Drawing Figures

RADIO BEACON FOR AERIAL NAVIGATION SYSTEM

FIELD AND BACKGROUND OF THE INVENTION

My present invention relates to an aerial navigation system utilizing the Doppler effect. Such systems often make use of radio-navigational beacons installed on the ground and constituted by a plurality of dipoles arranged in a straight line or a circle, the dipoles being successively fed with high-frequency energy by switching circuits. These beacons simulate for the airplane a mobile emitter of radio waves executing a periodic motion.

The position of the airplane (elevation and/or azimuth) with respect to the beacons is often determined by counting the phase shifts introduced by the displacement of simulated mobile dipole from one end of the beacon to the other. This position determination is carried out with only limited precision, unless the beacons on the ground have such a large number of dipoles that their cost becomes prohibitive. Moreover, the installations become inoperative in the event any of the dipoles ceases to function so that the count obtained by the signal evaluation no longer has any significance.

In commonly owned U.S. Pat. No. 4,019,184, whose disclosure of which is incorporated herein by reference, I have disclosed a process and apparatus for the treatment of phase-modulated signals which are received aboard an airplane and, with the aid of one or more rotating disks in the path of a light beam modulated by these signals, are converted into a visual display. The disk speed is correlated with the motion of a ground-station aerial array comprising, for example, two dipoles each located at one end of an arm rotatable around an axis. The apparatus thus furnishes the pilot with a simultaneous visualization, in terms of elevation and azimuth, of the position of the airplane with respect to the beacon, while eliminating the effects of interfering signals reflected by obstacles.

OBJECT OF THE INVENTION

The object of my present invention is to provide an air-navigational beacon which, while comprising an array of stationary radiators such as dipoles, is designed to simulate an imaginary circular beacon so that the radio waves sent out by these radiators can be evaluated aboard an aircraft in a processor for signals having the character of waves emitted by a rotating source, e.g. as described in the aforementioned prior patent.

SUMMARY OF THE INVENTION

I realize this object, in accordance with my present invention, by providing a multiplicity of stationary radiator pairs, the radiators of each pair being interconnected by an imaginary line whose length changes from one pair to another. The lengths of these imaginary lines, which are all parallel to a predetermined direction, vary as a sinusoidal function of the time of energization of the respective radiator pairs by supply means exciting these pairs in cyclic succession. Thus, the waves transmitted by these successively excited radiator pairs seem to come from two oppositely moving sources executing simple harmonic motions.

According to a more specific feature of my invention, the radiators of each pair are energized in mutual quadrature (i.e. with a relative phase shift of $\pi/4$) and/or with signal amplitudes which are substantially proportional to their spacing and, hence, to the length of the imaginary line interconnecting them.

BRIEF DESCRIPTION OF THE DRAWING

The above and other features of the invention will now be described in detail with reference to the accompanying drawing in which.

DETAILED DESCRIPTION OF THE INVENTION

Figure 1:
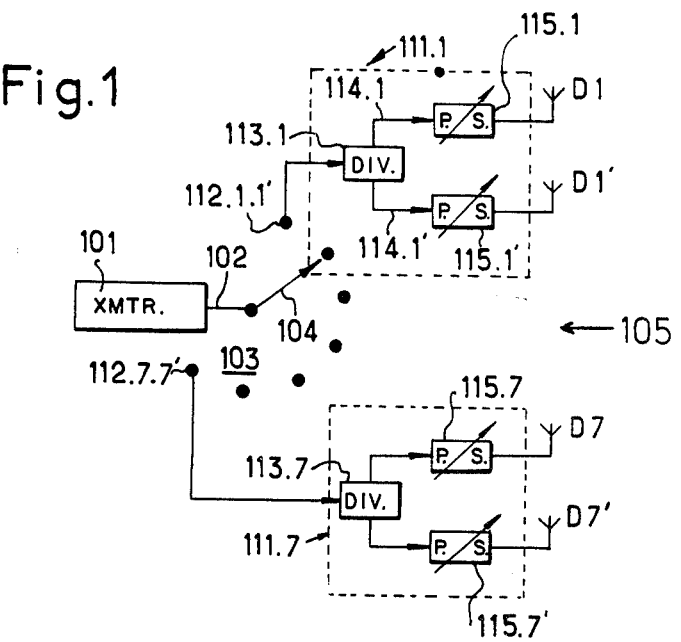
FIG. 1 is a block-diagram of a beacon according to the invention.

A transmitter 101 of coherent radiant energy (FIG. 1) of a frequency on the order of a gigahertz feeds at its output 102, by means of an electronic commutator 103, represented by a rotating switch arm 104, a linear array 105 of dipole pairs D1, D1' . . . D7, D7'. The several pairs are disposed along lines which are parallel to a given direction (vertical in FIG. 1) and their spacing varies from one pair to another in a manner about to be described.

Along a circle 106 (FIG. 2) there are marked an even number of points which are equiangularly distributed around the center 107. In the example shown in the drawing, fourteen points have been marked. Two points diametrically opposite each other constitute a pair and have been designated by the same reference numeral supplemented in one instance by a prime mark. Seven pairs a1, a1'; a2, a2'; a3, a3'; a4, a4'; . . . a7, a7' are thus defined. On the right-hand portion of FIG. 2, the various points a1–a7, a1'–a7' have been shown projected at 1–7, 1'–7' upon a reference line such as, for example, the vertical diameter a1, a1' of circle 106; the lines joining the projections of the paired points have been transversely separated for the sake of clarity.

Thus, there are found to be:

a pair of points 1,1' spaced by a distance $$2R$$

where R is the radius of the circle 106;

two pairs of points 2,2' and 7,7' with a spacing equal to $$2R \cos \Phi_2$$

or $$2R \cos \Phi_7$$

where $\Phi_2$ and $\Phi_7$ being the angles which the diameters a2, a2' and a7, a7' include with the reference diameter a1, a1' and which are, in the example, equal to $360°/14$;

two pairs of points 3,3' and 6,6' with a spacing equal to $$2R \cos \Phi_3$$

or $$2R \cos \Phi_6;$$

two pairs of points 4,4' and 5,5' with a spacing equal to $$2R \cos \Phi_4$$

or $$2R \cos \Phi_5.$$

Angles $\Phi_3$–$\Phi_6$ are defined analogously to angles $\Phi_2$, $\Phi_7$.

Figure 2:
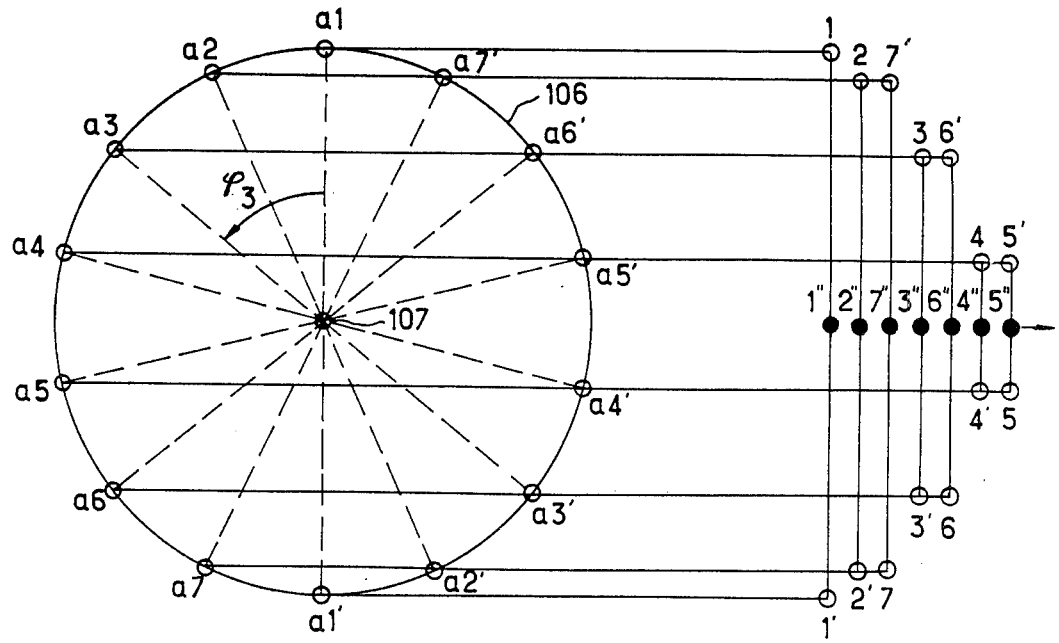
FIG. 2 diagrammatically shows an imaginary circular beacon to be simulated by the beacon of FIG. 1.

In FIG. 2, the midpoints of the lines 1—1', 2—2' ... 7—7' have been designated 1", 2" ... 7".

The radiators D1–D7, D1'–D7' of the antenna array 105 of FIG. 1 are arranged in conformity with the similarly designated points 1-7, 1'-7' of FIG. 2, i.e. with the spacings of pairs D1,D1' etc. corresponding to those of pairs 1,1' etc., except that their midpoints need not lie on a straight transverse line (as illustrated for points 1"-7") but may be relatively offset in a direction parallel to the imaginary lines interconnecting the paired dipoles. These spacings, accordingly, vary according to a sinusoidal or harmonic law expressed by the cosine functions given above.

The dipoles D1,D1' are connected by a coupling circuit 111.1 (FIG. 1) to a bank contact 112.1.1' of the electronic commutator 103. The connection is analogous with respect to the other dipole pairs; thus, dipoles D7,D7' are connected by a circuit 111.7 to a bank contact 112.2.7' of the commutator 103.

The coupling circuit 111.1 comprises, besides the contact 112.1.1', a power divider 113.1 which delivers to each of two paths 114.1 and 114.1' half of the power fed to its input. A phase shifter 115.1 is provided in path 114.1 and a phase shifter 115.1' is provided in path 114.1'. The phase shifts introduced by these circuit elements 115.1 and 115.1' are such that the high-frequency signal radiated by the dipole D1' is dephased by $\pi/4$ with respect to the signal radiated by the dipole D1.

The other coupling circuits are constituted in the same manner as the circuit 111.1. Thus, for example, circuit 111.7 comprises a divider 113.7 working into two paths with phase shifters 115.7, 115.7' whereby the signal radiated by the dipole D7 is in quadrature with respect to signals radiated by companion dipole D7'.

An airplane 121 (FIG. 3), whose position one wishes to determine with respect to the beacon 105, is equipped with an antenna 122 adapted to detect the signals emitted by the beacon 105, the detected signals being fed to a linear receiver 123, generating suitably amplified video-frequency signals. The output circuit 124 of receiver 123 comprises a nonlinear element, for example a square-law impedance such as a diode 125, adapted to provide at its output the product of the signal components applied to it.

The mixer or modulator 125 thus causes the appearance, at a given instant, of the product of the two sine waves, present in the receiver output, respectively generated by the dipoles of a pair whose emitted signals are received at that instant. On reception, the original pulsatance $\omega$ of these sine waves is modified by the Doppler shift due, on the one hand, to the displacement of the airplane relative to the beacon and, on the other hand, to the apparent relative displacement of two mobile radiation source simulated by the commutation of the dipoles. The product of these two sine waves is equivalent to the sum of two sinusoidal oscillations of which the first, under the assumed conditions, has a pulsatance of about $2\omega$ while the second has a pulsatance equal to the difference between the two Doppler-modified pulsatances.

A low-pass filter 126 eliminates the high-frequency oscillation of pulsatance close to $2\omega$. The low-frequency oscillation passed by this filter does not include the Doppler shift resulting from the movement of the plane, that shift affecting only the suppressed high-frequency oscillation. The signal present at the filter output 127 consists thus of only the Doppler shift resulting from apparent source motion to the exclusion of the relative movement of the aircraft, this output signal being evaluated in a processor 128.

The apparatus 128 is advantageously of the type described by me in the aforementioned U.S. Pat. No. 4,019,184.

The output 127 of filter 126 may be considered connected to any one of the inputs of the apparatus described in that prior patent. This is possible because a beacon constituted by a multiplicity of pairs of dipoles as described above (the dipoles of any one pair being excited simultaneously and the distances of the dipoles of the successively excited pairs varying sinusoidally as a function of energization or excitation time) is equivalent to a beacon constituted by two antennas fixed to the ends of an arm rotating around its center such as that described in the prior patent.

Consider an imaginary beacon, of the type schematically shown in the left-hand portion of FIG. 2, whose circle 106 lies in a vertical plane. In this case the phase shifts introduced by the displacement of the two simulated diametrically opposite mobile sources, one of which recedes from the airplane while the other approaches same airplane, permit the determination of the elevation of the craft with respect to the beacon. The imaginary lines interconnecting the paired dipoles of the actual beacon, schematically represented at right in FIG. 2, are thus vertical.

A beacon comprising dipole pairs of with horizontal and parallel connecting lines enables the measurement of the azimuth.

Figure 3:
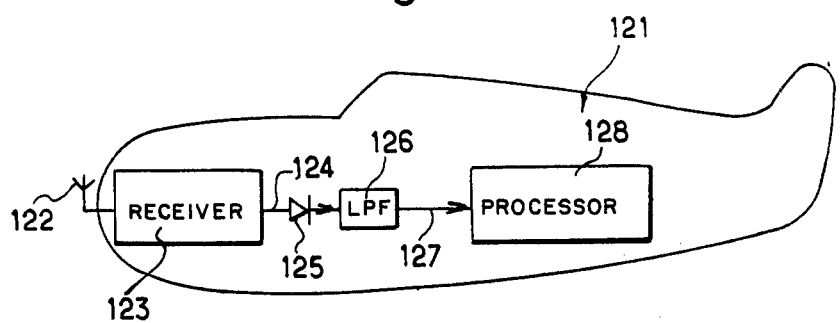
FIG. 3 is a schematic view of an airplane equipped with a receiver for signals emitted by the beacon of FIG. 1.

At the instant $t_1$, when the airplane receives the signals from dipoles D1 and D1', the phase difference $\Delta\phi_{1,1'}$ conveyed by the intermodulated and filtered signals to the input of the processor 128 of FIG. 3 is expressed by:

$$\Delta\phi_{1,1'} = (\pi/4) + (4\pi R/\lambda) \sin \Phi \tag{1}$$

Figure 4:
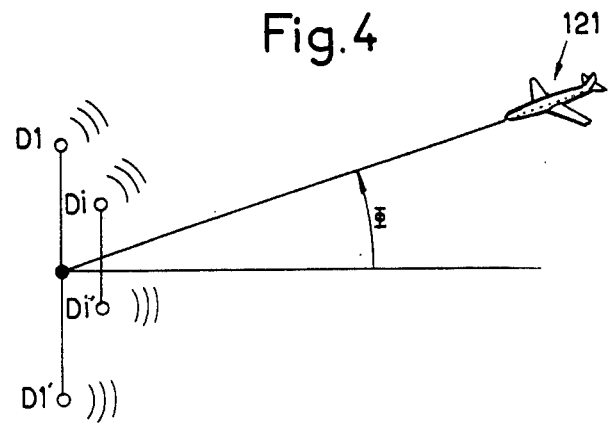
FIG. 4 is a diagram illustrating the operation of a system embodying my invention.

In this equation:

$\lambda$ is the wavelength corresponding to the frequency of the transmitter 101;

$\Phi$ is the angle of elevation of the airplane 121 (FIG. 4).

At the instant $t_i$ in the operating cycle of the beacon, the dipole pair $D_i$, $D_i'$ is energized. The phase difference of the signals respectively received from dipole $D_i$ and dipole $D_i'$ is given by the formula:

$$\Delta\phi_{i,i'} = (\pi/4) + (4\pi R/\lambda)\cos\Phi_i \sin\Phi \quad (2)$$

In this formula:

$\Phi_i$ is the value of the angle included between the imaginary reference and instantaneous diameters, i.e. the angle $\phi_3$ of FIG. 2 where the equivalent positions of dipoles Di, Di' are assumed to be the points a3, a3'.

In the formulas (1) and (2) above, $\pi/4$ results from the phase shift introduced by circuit elements 115.1, 115.1' of FIG. 1 and by corresponding phase shifters associated with dipoles Di, Di'.

The processor 128 thus receives at its data input 127 a signal whose phase is sinusoidally modulated according to the foregoing equation (2). As the maximum amplitude of modulation is proportional to the product of the value $4\pi R/\lambda$, given by the parameters of the beacon, times the unknown value $\sin\Phi$ which is to be determined, the apparatus 128 makes possible the measurement of the angle of elevation $\Phi$.

The precision of the measurement, $\Delta\Phi$, of the angle $\Phi$ is given by the expression:

$$(\Delta\Phi)_{-3dB} = \lambda/4\pi R \cos\Phi \quad (3)$$

where $(\Delta\Phi)_{-3dB}$ represents the value at $-3dB$ of the response curve of the processor.

For elevational angles of small magnitude, which is the case in the course of landing, this expression is approximately equal to:

$$(\Delta\Phi)_{-3dB} = \lambda/4\pi R$$

The precision of the measurement is about twice that of a system using a beacon of length 2R and comprising dipoles aligned and switched to simulate a source moving at uniform speed.

This increase in precision is related to the fact that the phase modulations of the signals present at the processor input 127 and respectively received from paired dipoles Di and Di' are opposite in sign and that their effects are added in the subtractive combination of these signals.

At the output of the nonlinear modulating element 125, the quadratic parts of the phase modulations corresponding to the dipoles Di and Di' are equal and of the same sign. The phase difference detectable by the apparatus upon elimination of this quadratic modulation makes it possible to limit the distance between the two simultaneously excited dipoles, this distance makes it possible to increase the distance between depending upon the precision which is desired, while eliminating the effect of the sphericity of the waves, thus rendering the system operational even for plane-to-beacon distances which are relatively small.

For a beacon whose maximum dimension is equal to 10 m, a conventional structure is unable to measure angles at a distance between the aircraft and the beacon below 7 km (for $\lambda = 5$ cm). With the installation described, the measurement of the angle occurs in a satisfactory manner at much smaller plane-beacon distances, practically down to 70 m.

Figure 5:
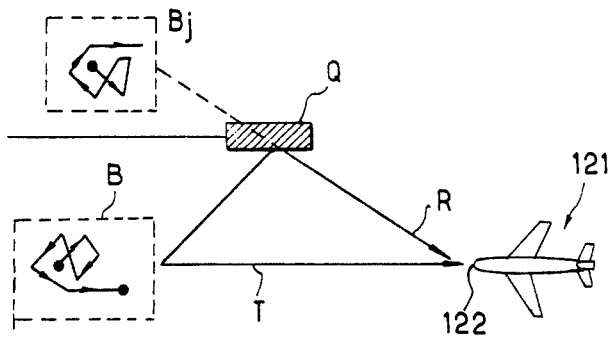
FIG. 5 is another diagram illustrating the operation of such a system.

FIG. 5 schematically illustrates an airplane 121 whose antenna 122 simultaneously receives the radio signal emitted by the beacon B via a direct path T and the radio signal from that beacon having a path R resulting from reflection off an obstacle Q.

For the airplane 121, the signals transported by the reflected signal are equivalent to those which would be furnished by a beacon Bj representing a mirror image of the beacon B; the mirror being constituted by the reflective obstacle Q. For the image Bj, the arrows corresponding to the order of succession of the excitations of the pairs of dipoles Di,Di' of any beacon structure have the same direction when they are parallel to the mirror and, on the other hand, have opposite directions when they are perpendicular to the mirror. Consider a pair of so-called object signals OS, OS', received aboard the plane 121 from dipoles Di, Di' over the direct path T, and a pair of so-called image signals IS, IS', received from the same dipoles by deflection along path R. Modulating element 125 then produces four multiplication products OS·OS', IS·IS', OS·IS' and IS·OS'. The cross-products OS·IS' and IS·OS', termed "electronic echoes", have a random supplemental phase difference giving rise to a correlation error which eliminates their contribution to the result furnished by the processor 128 which effects inter alia a correlation.

The beacon according to the invention, with a random or otherwise irregular distribution of the centers of the dipole pairs whose relative offsetting has been illustrated in FIG. 4, likewise permits the utilization of the usual type of filters already in use on airplanes which are designed to function with conventional beacons having aligned dipoles excited in a manner such as to simulate a mobile source executing a uniform linear movement.

Figure 6:
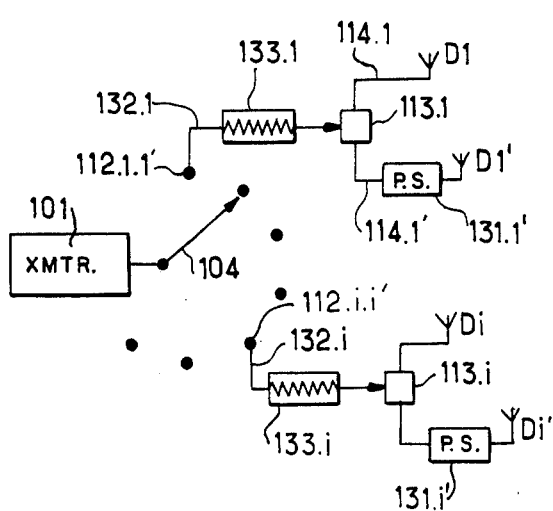
FIG. 6 is a block diagram representing another embodiment of the invention.

In the embodiment of FIG. 6, the transmitter 101 radiates energy successively to a multiplicity of dipole pairs D1,D1' ... Di,Di'. The dipoles are at the end of paths 114.1, 114.1' ... 114.i, 114.i' ... leaving the power dividers 113.1 ... 113.i ..., the paths 114.1' etc. each comprising a phase shifter 131.1 ... 131.i introducing a phase shift of $\pi/4$ with respect to the corresponding path 114.1 etc. Coupling circuit 132.1, connecting the contact 112.1.1' of the electronic switch 104 to the power divider 113.1, includes a device 133.1 which balances the amplitudes of the high-frequency signals radiated by the dipoles D1 and D1'. The balancing factor is equal to:

$$a \cdot \cos\Phi_1$$

In this formula:

a is a constant, and $\Phi_1$ has the same meaning as in FIG. 2.

Such a balancing impedance is provided in the coupling circuit of each pair of dipoles. Thus, for example, the device 133.i balances the amplitudes of the waves radiated by the dipoles Di,Di', the balancing factor being equal to:

$$a \cdot \cos\Phi_i$$

In the case where a large number of dipole pairs are used, some of the devices such as impedance 133.i have a balancing factor $a \cdot \cos\Phi_i$ of very low value. They are associated with short-spacing dipole pairs. Since these dipoles emit only a low power, they could be omitted along with the corresponding balancing impedances for the sake of simplification. Moreover, the dipole pairs so eliminated might have been subjected, by reason of their proximity, to an undesirable cross-coupling by reciprocal radiation.

Figure 7:
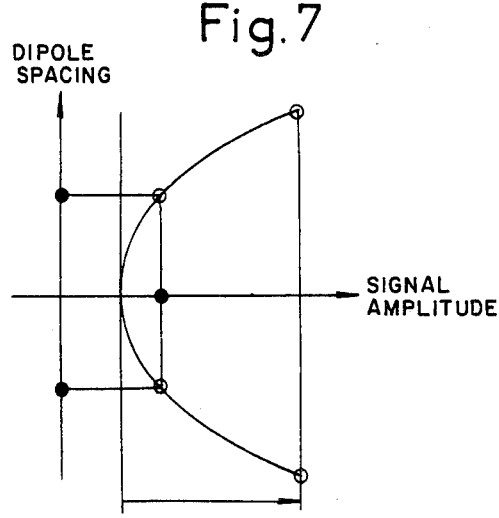
FIGS. 7, 8 and 9 are diagrams illustrating the operation of the beacon of FIG. 6.

FIG. 7 schematically illustrates the significance of the modulation factor for each pair of dipoles. In this diagram, the spacing between two dipoles of a pair is plotted along the ordinate and the amplitude of the signals emitted by a pair of dipoles appears on the abscissa.

Figure 8:
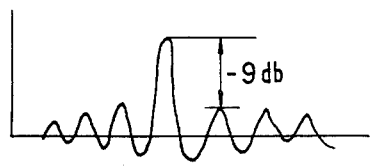

FIG. 8 is a correlation curve obtained in the absence of amplitude modulation. It is a Bessel function of the order zero or $J_0$. In the example considered, the level difference between the peak of the Bessel curve and that of the closest lateral lobe corresponds to $-9$ db.

Figure 9:

FIG. 9 shows the correlation curve when the energy emitted by the dipoles is modulated as a function of the spacing of the paired dipoles, as indicated hereinabove. It is then the sum of the Bessel function $J_0$ and a function $J_2$ which is a Bessel function of the first type, second order. The apodization or sidelobe suppression will be apparent from the reduction of the height of the first lateral lobe whose level differs $-23$ db from the peak of the curve.

I claim:

1. In an aerial navigation system wherein a ground station has a beacon for sending out radio waves to be received aboard an aircraft equipped with a processor for signals having the character of waves emitted by a rotating source, the improvement wherein said beacon comprises a multiplicity of stationary radiator pairs, the radiators of said pairs being interconnected by imaginary lines all parallel to a predetermined direction, and supply means for energizing said radiator pairs in cyclic succession, the lengths of said imaginary lines varying as a sinusoidal function of the time of energization of the respective radiator pairs.

2. The improvement defined in claim 1 wherein said supply means includes phase-shifting means for energizing the radiators of each pair in relative quadrature.

3. The improvement defined in claim 1 wherein said supply means includes impedance means for making the amplitudes of the waves sent out by said radiator pairs substantially proportional to the lengths of the imaginary lines respectively interconnecting said pairs.

4. The improvement defined in claim 1 wherein said supply means includes circuit means for energizing the radiators of each pair in relative quadrature and with a signal amplitude substantially proportional to the spacing of its radiators.

5. The improvement defined in claim 1 wherein said imaginary lines have midpoints relatively offset in said predetermined direction.

6. The improvement defined in claim 1 wherein said predetermined direction is vertical for providing elevational information aboard said aircraft.

7. The improvement defined in claim 1 wherein said predetermined direction is horizontal for providing azimuthal information aboard said aircraft.

* * * * *